Aug. 21, 1945.  H. SCOTT ET AL  2,383,344
PURIFICATION OF GASES
Filed May 13, 1942
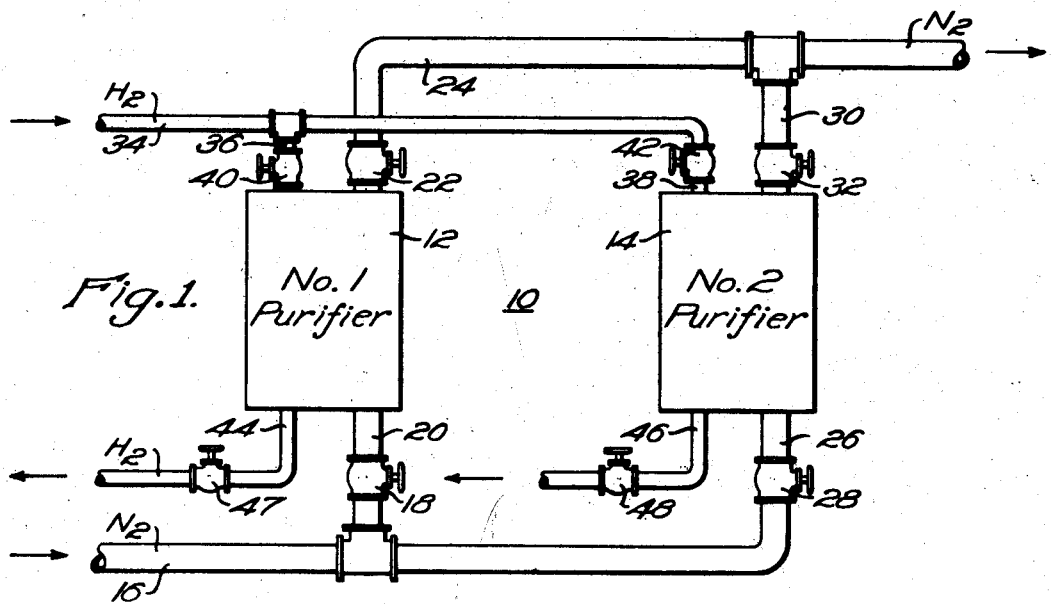
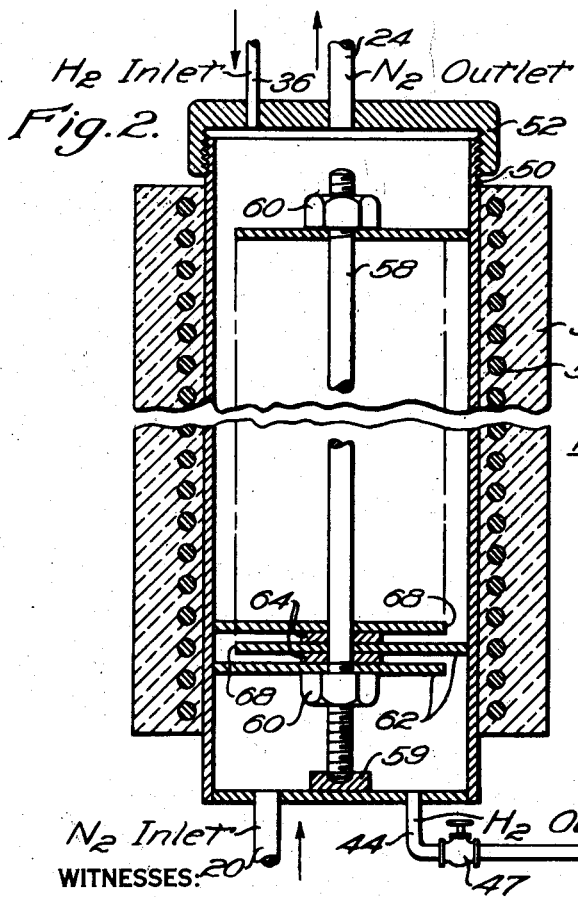
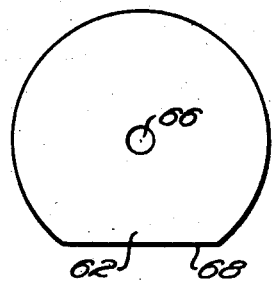
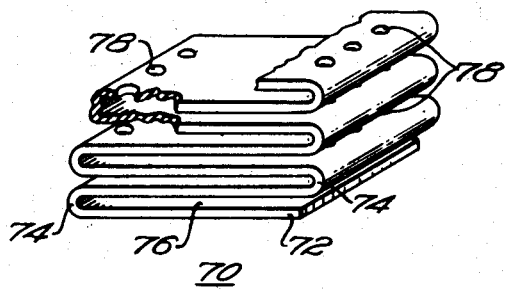
WITNESSES:
Robert C. Baird
J. Shapoe
INVENTORS
Philip R. Kalischer and
Howard Scott
BY
Ezra W. Savage
ATTORNEY

UNITED STATES PATENT OFFICE 2,383,344

PURIFICATION OF GASES

Howard Scott, Forest Hills, and Philip R. Kalischer, Wilkinsburg, Pa., assignors to Westinghouse Electric Corporation, East Pittsburgh, Pa., a corporation of Pennsylvania Application May 13, 1942, Serial No. 442,766

2 Claims. (Cl. 23—277)

The present invention relates to the treatment of gases containing impurities, particularly for removing impurities of the type of oxygen and water vapor from gases.

The object of this invention is to provide an apparatus capable of efficiently removing impurities from large quantities of gases and capable of reactivation a number of times.

A further object of the invention is to provide for removing oxygenous impurities from gases to predetermined concentrations by reacting the gases at selected temperatures with ferrous material having reacting surfaces of massive form.

Other objects of the invention will, in part, be obvious and will, in part, appear hereinafter. For a fuller understanding of the nature and objects of the invention, reference may be had to the following drawing, in which:

Figure 1 is a schematic drawing of a purification system;

Fig. 2 is a vertical cross section view through one of the purifiers of Fig. 1;

Fig. 3 is a plan view of one of the reaction discs employed in the purifying unit; and Fig. 4 is a fragmentary perspective view of a modified form of reaction member.

Heretofore, in purifying gases, it has been a conventional practice to introduce pulverulent reagents in absorbing towers through which the gases to be purified are passed. Under certain conditions and with certain gases, the powdered absorbing reagents have increased considerably in volume whereby the gas passages have been clogged and flow either greatly diminished or substantially stopped. Some of the reacting materials heretofore employed are incapable of reactivation whereby re-use thereof can be obtained and consequently the materials must be discarded after one use. It is the purpose of this invention to provide a gas purification system including a predetermined construction of relatively massive metallic members whereby gas flow is not impeded at any time and highly efficient removal of predetermined impurities to predetermined concentrations is obtained. Furthermore, this system is so designed that the purifying elements thereof may be reactivated a great number of times for substantially permanent use.

Referring to Fig. 1 of the drawing, there is shown schematically a gas purification system 10 capable of substantially continuous use as well as providing further for reactivation of the impurity removing members thereof, while other units are removing undesirable impurities from the gases being treated. The system 10 comprises purifiers 12 and 14, labeled No. 1 purifier and No. 2 purifier, respectively. These purifiers are so disposed in relation to the system of gas piping that the purifier units may be alternately operated whereby one unit is functioning to purify the gas while the other unit is being reactivated.

In the system 10, the conduit 16 is the main inlet for the gas to be purified. A valve 18 in the lateral conduit 20 controls the admission of the gas to the purifier 12. The purified gases are led off through conduit 24 controlled by valve 22 to the point of application for the purified gas. The conduit 16 terminates in a second lateral conduit 26 controlled by valve 28 and leading to purifier 14. The purified gases from the purifier 14 are led through the outlet conduit 30 controlled by valve 32.

Reactivating fluids or gases to revive the purifying agents in 12 and 14 may be introduced into the purifiers from the pipe 34 through lateral piping 36 and 38 controlled, respectively, by valves 40 and 42. The pipe 36 leads to purifier 12, while the pipe 38 leads to purifier 14. The used reactivating fluid is led off through pipes 44 and 46, controlled by valves 47 and 48 respectively, connecting to an outlet therefor and may be suitably disposed of thereafter.

In case the impurities being removed from the gas being purified are oxygenous, hydrogen gas can be effectively used as the reactivating gas. The following method of operating the system is suggested to give continuous purification and reactivation as needed. Assume purifier 12 has absorbed nearly all the oxygenous impurities that it can, then valves 28 and 32 of purifier unit 14 are opened to cut unit 14 into the circuit, while valves 18 and 22 of unit 12 are closed to cut it out of the gas circuit. Valves 40 and 47 are set to open position to allow passage of hydrogen through unit 12. The hydrogen gas entering from pipe 36, being lighter, forms a layer above the heavier gases present in the unit 12 and forces them out exhaust pipe 44. As the hydrogen gas comes into contact with the reacted oxygenous impurities in the unit it will tend to react with them to form water, present as vapor, and thereby the oxygen impurity reacting substance in the unit 12 is revived or reactivated for further removal of oxygen. The water vapor is also quickly exhausted through pipe 44. A simple check of water vapor content indicates when reactivation has been completed. In practice the reactivation has been accomplished rapidly. Closing valves 40—47 renders unit 12 ready for replacing unit 14 as the latter becomes less effective for removal of impurities.

The internal construction of the purifier units 12 and 14 is shown in greater detail in the sectional view of Fig. 2. The unit 12 as shown is typical of the construction. A gas-tight cylindrical casing 50 of some particularly chemically resistant metal, such as nickel, is provided for containing the gas impurity removing means. A screw-threaded cover 52 is connected with the shell 50 to provide for assembly and disassembly of the absorber means as occasion demands. To the cover 52 may be attached the purified gas outlet 24 and the reactivating fluid inlet 36. At the bottom of the casing 50, the purified gas inlet 20 may be attached, and the reactivating gas outlet 44 may be likewise attached thereto. Heat insulation may be applied completely around the casing 50 and cover 52 as determined by practical considerations.

Within the heat insulating body 54 is located a heating element 56 suitable for producing a temperature of the order of 500 to 1000° C. Electrical resistance heating elements are one suitable means of effecting heating. In other cases, combustible gases may be introduced into piping at 56 to provide for heating by combustion therein.

Within the cylindrical chamber defined by casing 50 and cover 52, there is located a supporting shaft 58 resting on a suitable base 59. Nuts 60 threadedly engaged with the shaft 58 provide for retaining in predetermined relation a plurality of impurity absorbing sheets or discs 62 of substantially circular form fitting closely the casing 50 and spacing washers 64.

Referring to Fig. 3 of the drawing, a plan view of one of the sheets or discs 62 is shown. The disc 62 contains a central aperture 66 adapted for fitting slidably over the shaft 58. The periphery of one side of the disc is cut off at 68 in order to permit gas flow past the disc when it is within casing 50. The structure shown in Fig. 3 is exemplary of a suitable disc contour or formation in which a portion along a chord is removed. Other designs of the disc departing from a complete circular structure are contemplated. For example, instead of removing a portion of the circle along a chord, holes may be drilled or punched near the periphery of the disc, or the periphery may be cut into various other formations in a localized area. One criterion is that in a circular disc, for example, material be removed at one limited portion of the periphery only to effectuate a proper directional gas flow. A further requirement is that the area removed correspond to the average sectional area of the space between discs to give least resistance to gas flow. In case the casing 50 is of a form other than a circle, for example, a hexagon, then the disc 62 should be of a hexagonal form corresponding to the casing and closely fitting thereto, except at one portion of the periphery thereof where some portion of the disc is removed.

The washers 64 may be either prepared from some relatively inert metal or a suitable gas-reacting material similar to the discs 62.

In providing for good flow of the gas being purified over the gas-reacting discs 62, it is desirable to so mount the discs 62 and washers 64 alternately that the flow of gas from disc to disc results in alternate reversal of direction gas flow, whereby substantially the entire area of the discs are in contact with the entire gas stream. The aperture 66 is shown as circular, and the discs should be carefully stacked and the nuts 60 applied without permitting the discs to become disarranged. It may be desirable in some cases to use a shaft 58 with a square body and a mating square hole 66 to provide for a fixed position of the discs on the shaft. As shown in Fig. 2, the cutoff portions 68 of the discs 62 are stacked alternately on opposite sides of the shaft 58. This provides for securing the maximum surface area in contact with the gases.

Referring to Fig. 4 of the drawing there is illustrated a fragmentary perspective view of a modified form of a relatively massive gas impurity reacting member 70. The member 70 is suitable for use with a square or rectangular shaped casing 50. The member 70 is prepared by bending a strip of iron or steel in an accordion fold arrangement, the bends 74 fitting closely to two opposite side walls of the casing 50, the width of the strip being substantially that between the other two sides of the casing. The space 76 between folds is substantial and usually is sufficient to prevent obstruction of gas flow when it equals the thickness of the strip 72. Either before or after bending the strip 72, apertures 78 are punched or drilled to permit for gas flow along all the surfaces of the member 70.

Other forms of gas-reacting members of similar massive form to those shown in Figures 3 and 4 whereby gas obstructing growth of the members will not take place will be apparent.

The discs 62 or members 70 may be prepared from either some metal or relatively durable material which is capable of reacting with the undesired impurities in the gases being treated at some elevated temperature and further capable of reacting with a fluid or gas for reduction to its initial state whereby the discs or accordion member 70 may be capable of subsequently re-absorbing more impurity.

As an example of the successful operation of the apparatus for removing oxygenous gases, the discs 62 were prepared from iron. They could be conveniently formed from a low carbon steel approximately $\frac{1}{16}$ inch thick by punching out from a strip. The spacers are formed from the same material but are of a much smaller diameter.

In purifying nitrogen in order to remove oxygen and oxygenous gases, steel discs of low carbon content have been found to be particularly effective. In a small unit containing 150 discs of 2 inches in diameter maintained at a temperature of about 800° C. within the casing 50, 50 cubic feet per hour of nitrogen were purified from one part of oxygen in 800 of nitrogen to a value of less than one part of oxygen in 10,000 of nitrogen. The oxygen was fixed as the oxide of iron on the disc surfaces.

The iron oxide film is relatively coarse and does not inhibit oxidation until the oxide has formed to a relatively greater thickness. At temperatures of about 800° C. the iron oxide is tenaciously adherent and will not flake off. Initially the discs nearer the entry are oxidized most extensively and during continuing operation the farther removed discs become oxidized at a greater rate. Some 1500 cubic feet of average tank nitrogen had been purified by the unit described before the degree of purity of the gases became less than the standard of one part of oxygen in 10,000 of nitrogen and reactivation was required.

By selecting suitable temperatures at which the reacting iron surfaces are maintained the concentration of oxygenous gases may be kept at predetermined low concentrations. For example, a concentration of less than one part of oxygenous gas in 10,000 parts of nitrogen is obtained at temperatures of 800° C. Such a gas is useful in fusing glass to metal in producing gas tight joints. This concentration of oxygenous gas is required in maintaining an oxide free surface on the metal for best results. As previously described, hydrogen gas is a satisfactory reactivating agent for removing oxygenous impurities reacted with the discs 62. The hydrogen gas is bled into the purifier 12 for example, while the purifier is maintained at about 800° C. In a short while the oxygen present as the oxide will be reduced and pure iron will be left upon the discs. The unit is ready for re-use whenever desired. While the purification is being conducted, purifier number 14 will be in operation treating the gas from conduit 16. When the purifier 14 has become oxidized to the extent that it is no longer sufficiently effective, it may be closed off from the gases being treated and hydrogen let in thereto to reduce the iron oxides.

In the case that other gases than oxygen or oxygen bearing gases are intended to be removed from a given gas being treated, other metals than iron may be selected as gas absorbing material. For most oxygenous gases, such as oxygen, water and carbon dioxide, iron has functioned exceedingly satisfactory. There has been no clogging of the passages between the alternate discs. The units have been reactivated a great number of times without any detrimental effect upon their surfaces or other physical condition being observed.

Since certain changes may be made in the above apparatus and different embodiments of the invention could be made without departing from the scope thereof, it is intended that all matters shown in the above description or shown in the accompanying drawing shall be interpreted as illustrative and not in a limiting sense.

We claim as our invention:

1. A device for treating gases to remove oxygenous impurities therefrom comprising, in combination, a cylindrical shell forming an enclosed chamber, a plurality of ferrous metal plates of relatively massive shape and form stacked within the chamber, the plates being circular in shape, each plate having a portion of the edge cut out, a spacer positioned between each plate to provide a space for flow of gases, the plates being so arranged within the shell and the cut out edge portions staggered so that gas is forced to travel back and forth across the surfaces of successive metal plates.

2. A device for treating gases to remove oxygenous impurities therefrom comprising, in combination, a cylindrical shell forming an enclosed chamber, a supporting shaft positioned longitudinally within the chamber of the cylindrical shell, a plurality of ferrous metal plates of relatively massive shape and form provided with perforations corresponding to the supporting shaft stacked upon the supporting shaft within the chamber, the metal plates having a shape closely fitting the cylindrical shell, a portion of the edge of each plate being cut off to provide for passage of gas and a spacer disposed on the supporting shaft between each plate, the spacers being of a thickness approximately equal to that of the plates, the plates being so arranged on the supporting shaft that the cut out edge portions are staggered and gas is forced to travel back and forth over the surface of successive metal plates.

HOWARD SCOTT.
PHILIP R. KALISCHER.